(12) United States Patent
LeBeau

(10) Patent No.: US 8,997,315 B2
(45) Date of Patent: Apr. 7, 2015

(54) SELF-LOCKING CLIP SYSTEMS AND METHODS

(75) Inventor: Mark LeBeau, Logan, UT (US)

(73) Assignee: Nite Ize, Inc., Boulder, CO (US)

( * ) Notice: Subject to any disclaimer, the term of this patent is extended or adjusted under 35 U.S.C. 154(b) by 337 days.

(21) Appl. No.: 13/353,831

(22) Filed: Jan. 19, 2012

(65) Prior Publication Data

US 2012/0180267 A1 Jul. 19, 2012

Related U.S. Application Data

(60) Provisional application No. 61/461,541, filed on Jan. 19, 2011.

(51) Int. Cl.
*F16G 11/10* (2006.01)
*F16G 11/14* (2006.01)
*B63B 21/08* (2006.01)

(52) U.S. Cl.
CPC ............ *F16G 11/106* (2013.01); *F16G 11/143* (2013.01); *B63B 21/08* (2013.01)

(58) Field of Classification Search
CPC ....... F16G 11/10; F16G 11/04; F16G 11/106; B63B 21/08
USPC ........... 24/134 R, 134 HB, 328, 69 R, 265 H, 24/136 R, 298, 302, 301, 300, 132 R, 134 I, 24/134 P, 132 AA; 114/218; 294/82.19, 294/82.2
See application file for complete search history.

(56) References Cited

U.S. PATENT DOCUMENTS

| | | | | |
|---|---|---|---|---|
| 436,832 | A | * 9/1890 | Grange | ............................ 24/133 |
| 565,699 | A | * 8/1896 | Spencer | ........................... 188/64 |
| 916,091 | A | 3/1909 | Batzer | |
| 1,250,876 | A | * 12/1917 | Hicks | ........................... 24/134 R |
| 2,942,315 | A | * 6/1960 | Johnson | ...................... 24/134 R |
| 3,091,207 | A | * 5/1963 | Songer | ........................... 114/199 |
| 4,162,561 | A | 7/1979 | Tillemans | |
| 4,716,630 | A | * 1/1988 | Skyba | .......................... 24/134 R |
| 4,766,835 | A | 8/1988 | Randall et al. | |
| 4,993,123 | A | 2/1991 | Siwek | |
| 4,998,327 | A | * 3/1991 | Hull et al. | .................... 24/134 R |
| 5,368,281 | A | 11/1994 | Skyba | |
| 5,845,894 | A | 12/1998 | Petzl et al. | |
| 5,931,112 | A | 8/1999 | Lacan | |
| 6,068,242 | A | 5/2000 | Kingery | |
| 6,115,889 | A | * 9/2000 | Mickelson | .................. 24/115 R |
| 6,234,454 | B1 | 5/2001 | Vassioukevitch | |
| 6,292,984 | B1 | * 9/2001 | Nelson | ......................... 24/134 R |
| 6,378,650 | B2 | 4/2002 | Mauthner | |
| 6,742,770 | B1 | 6/2004 | Vassioukevitch | |

(Continued)

OTHER PUBLICATIONS

International Search Report in related PCT Application No. PCT/US2012/021858 dated May 2, 2012, 3 pages.

*Primary Examiner* — Robert J Sandy
*Assistant Examiner* — Michael Lee
(74) *Attorney, Agent, or Firm* — Squaire Patton Boggs (US) LLP

(57) ABSTRACT

A self-locking clip includes a clip body and a rotating cam gripper, the rotating cam gripper pivotally mounted on the clip body. The self-locking clip further includes a spring arm, the spring arm integrated into the clip body, the spring arm configured to provide tension to the rotating cam gripper such that the rotating cam gripper is held against a first gripping surface on the clip body.

14 Claims, 10 Drawing Sheets

(56) References Cited

U.S. PATENT DOCUMENTS

| | | |
|---|---|---|
| 6,793,046 B2 | 9/2004 | Petzl et al. |
| 7,073,780 B2 | 7/2006 | Stone |
| 7,111,572 B1 | 9/2006 | Yang |
| 7,222,840 B1 | 5/2007 | Stepper |
| 7,234,686 B2 | 6/2007 | Stone et al. |
| 7,287,303 B2 | 10/2007 | Yang |
| 7,428,769 B2 | 9/2008 | Fontaine et al. |
| 7,445,195 B1 | 11/2008 | Huang |
| 2005/0241117 A1* | 11/2005 | Skyba ............... 24/134 R |
| 2007/0137003 A1* | 6/2007 | Zebe, Jr. ............. 24/134 P |
| 2012/0311824 A1* | 12/2012 | Mulholland et al. ...... 24/301 |

* cited by examiner

SELF-LOCKING CLIP SYSTEMS AND METHODS

CROSS-REFERENCE TO RELATED APPLICATION

This application claims the benefit of U.S. Provisional Patent Application No. 61/461,541 filed on Jan. 19, 2011, the entirety of which is incorporated by reference.

BACKGROUND

In many situations, the ability for a use to quickly and effectively attach the end of a rope to an object is advantageous. Ordinarily, the user must tie the rope, which requires a knowledge of effective knots. In such a situation, the user may not be able to easily apply tension after tying or easily release the knot. Therefore, a device for improved tensioning and attachment is needed that does not require the user to take any significant steps.

SUMMARY OF THE INVENTION

In one embodiment, a self-locking clip includes a clip body and a rotating cam gripper, the rotating cam gripper pivotally mounted on the clip body. The self-locking clip further includes a spring arm, the spring arm integrated into the clip body, the spring arm configured to provide tension to the rotating cam gripper such that the rotating cam gripper is held against a first gripping surface on the clip body. Optionally, the rotating cam gripper is asymmetrically mounted, the rotating cam gripper configured such that, when the rotating cam gripper rotates in a first direction, the rotating cam gripper extends towards the spring arm, flexing the spring arm. In one configuration, the rotating cam gripper has a first channel, the first channel contacting the spring arm. In another configuration, the first channel terminates in a stop, the stop configured to prevent over-rotation of the rotating cam gripper. In one alternative, the self-locking clip includes a catch lip, the catch lip sized to fit in the channel, the catch lip configured to extend perpendicular to the rotating cam gripper and a direction of rotation of the rotating cam gripper such that the rotating cam gripper cannot be removed from the clip body without pulling the spring arm away from the rotating cam gripper. In another alternative, a first side of the clip body includes a cord guiding channel, configured to guide a cord over a notch and into a gripping area between the rotating cam gripper and the first gripping surface. Optionally, the notch is located in an aperture of the clip body. In one option, the rotating cam gripper has an approximately elliptical shape. Optionally, the approximately elliptical shape has a pointed and narrowed end at a first end of a major axis. In one alternative, the rotating cam gripper includes an axle-receiving aperture, asymmetrically located in the rotating cam gripper, configured to receive an axle extending from the clip body. In another alternative, the axle-receiving aperture is distal from the pointed and narrowed end. Alternatively, the self-locking clip includes a hook portion for hooking the self-locking clip to an object. Optionally, the hook portion includes a carbineer gate. In another alternative, the asymmetric mounting prevents the rotating cam gripper from rotating past the first gripping surface, by virtue of contact between the rotating cam gripper and the first gripping surface. In another configuration, the rotating cam gripper has a second gripping surface on a portion that interacts with the first gripping surface. Optionally, the rotating cam gripper is oriented such that pulling the cord in a first direction will rotate the rotating cam gripper towards the first gripping surface providing additional gripping of the cord.

In one embodiment, a method of securing a cord includes providing a self-locking clip, the self-locking clip including a clip body; and a rotating cam gripper, the rotating cam gripper pivotally mounted on the clip body. The self-locking clip includes a spring arm, the spring arm integrated into the clip body, the spring arm configured to provide tension to the rotating cam gripper such that the rotating cam gripper is held against a first gripping surface on the clip body. The self-locking clip including the rotating cam gripper is asymmetrically mounted, the rotating cam gripper configured such that, when the rotating cam gripper rotates in a first direction, the rotating cam gripper extends towards the spring arm, flexing the spring arm, and a notch located in an aperture of the clip body. The method further includes passing the cord over the notch and through the aperture.

The method further includes passing the cord between the rotating cam gripper and the first gripping surface in a first direction. The method further includes pulling the cord in a second direction opposite the first. The method further includes automatically locking the cord in place with the rotating cam gripper and the first gripping surface. "Automatically" means a user need not touch the self-locking clip.

In another embodiment, a self-locking clip includes a clip body and a rotating cam gripper, the rotating cam gripper pivotally mounted on the clip body. The self-locking clip further includes a spring arm, the spring arm integrated into the clip body, the spring arm configured to provide tension to the rotating cam gripper such that the rotating cam gripper is held against a first gripping surface on the clip body. The rotating cam gripper is asymmetrically mounted, the rotating cam gripper configured such that, when the rotating cam gripper rotates in a first direction, the rotating cam gripper extends towards the spring arm, flexing the spring arm, and a notch located in an aperture of the clip body. Optionally, the self-locking clip includes a catch lip, the catch lip sized to fit in a channel, the catch lip configured to extend perpendicular to the rotating cam gripper and a direction of rotation of the rotating cam gripper, such that the rotating cam gripper cannot be removed from the clip body without pulling the spring arm away from the rotating cam gripper. Alternatively, the rotating cam gripper includes an axle-receiving aperture, asymmetrically located in the rotating cam gripper, configured to receive an axle extending from the clip body.

In another embodiment, a self-locking clip includes a clip body and a first rotating cam gripper, the first rotating cam gripper pivotally mounted on the clip body. The self-locking clip further includes a first spring arm, the first spring arm integrated into the clip body, the first spring arm configured to provide tension to the first rotating cam gripper such that the first rotating cam gripper is held against a first gripping surface on the clip body. The first rotating cam gripper is asymmetrically mounted, the first rotating cam gripper configured such that, when the first rotating cam gripper rotates in a counterclockwise direction, the rotating cam gripper extends toward the first spring arm, flexing the first spring arm; and when the first rotating cam gripper rotates in a clockwise direction, the first rotating cam gripper presses against the first gripping surface, and a notch located in an aperture of the clip body. The self-locking clip further includes a second rotating cam gripper, the second rotating cam gripper pivotally mounted on the clip body. The self-locking clip further includes a second spring arm, the second spring arm integrated into the clip body, the second spring arm configured to provide tension to the second rotating cam gripper such that the second rotating cam gripper is held against a second gripping surface on the clip body. The second rotating cam gripper is asymmetrically mounted, the second rotating cam gripper configured such that, when the second rotating cam gripper rotates in a clockwise direction, the second rotating cam gripper extends toward the second spring arm, flexing the second spring arm; and when the second rotating cam gripper rotates in a counterclockwise direction, the second rotating cam gripper presses against the second gripping surface, the first and second cam grippers oriented on opposite ends of the clip body.

BRIEF DESCRIPTION OF THE DRAWINGS

The drawings are described briefly, as follows.

DETAILED DESCRIPTION

Figure 1:
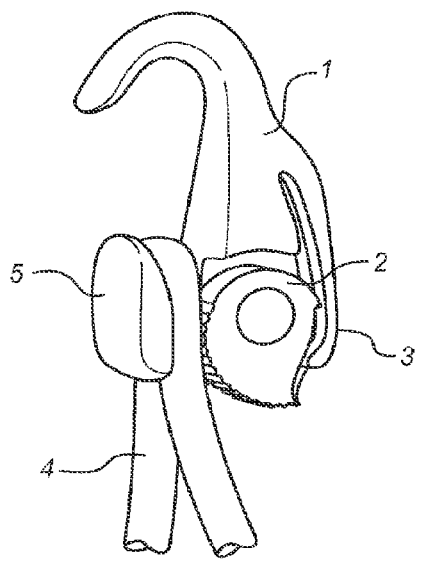
FIG. 1 is a perspective view illustrating an embodiment of a self-locking hook for a rope or cord, with an integrated spring acting upon a rotating cam.

Certain terminology is used herein for convenience only and is not to be taken as a limitation on the embodiments of a Self-Locking Clip or Hook. In the drawings, the same reference letters are employed for designating the same elements throughout the several figures.

The words "right," "left," "front," and "back" designate directions in the drawings to which reference is made. The words "inwardly" and "outwardly" refer to directions toward and away from, respectively, the geometric center of the Self-Locking Clip and designated parts thereof. The terminology includes the words above specifically mentioned, derivatives thereof, and words of similar import.

Like reference numerals designate like or corresponding parts throughout the various views and with particular reference to each of the Figures as delineated below.

As illustrated in FIGS. 1-13, a self-locking hook for a rope or cord is disclosed. The self-locking hook incorporates a hook or other attaching device and bends the rope around a body 1 so most of the force of the rope is absorbed on the fixed part of the body 1. The rope bending around the body 1 also serves to pull the rope tight in the direction away from the load that is fastened. It should be noted that, rather than a hook, other means of attaching is within the scope of this disclosure.

Figure 2:
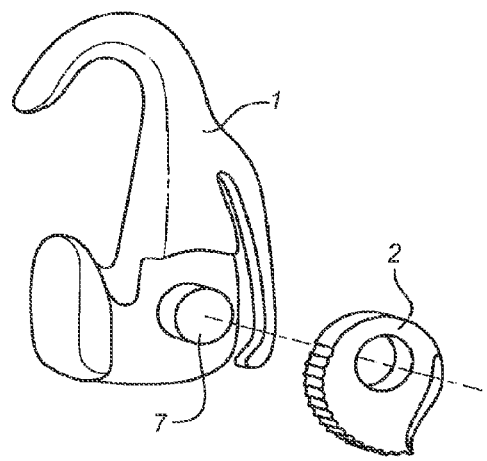
FIG. 2 is an exploded perspective view illustrating the self-locking hook for a rope or cord of FIG. 1.

FIG. 1 shows a first embodiment of a self-locking clip or hook. The self-locking hook is constructed from three main components. The self-locking hook first comprises a rotating cam 2 mounted on a boss 7. Boss 7 may also be referred to as an axle. The rotating cam, as it rotates, causes the gap between a fixed block 5 and the rotating cam 2 to become smaller or larger. When the rope is in the gap, as the rope 4 pulls through the space between the fixed block 5 and the rotating cam 2, the gap becomes smaller, thereby releasably locking the rope in place. The rotating cam 2 may have a plurality of teeth for grabbing the rope or cord and further inhibits the rope or cord from slipping through the gap. FIG. 2 shows the cam removed from the hook body.

Figure 3:
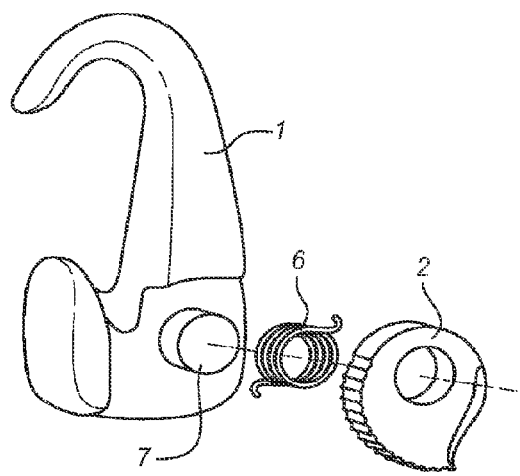
FIG. 3 is an exploded perspective view illustrating another embodiment of the self-locking hook for a rope or cord with a torsion spring between the rotating cam and the body.

In addition, the self-locking hook has a spring mechanism between the rotating cam 2 and the body 1. The spring mechanism can be a spring 3 integrated into the body 1, or the spring mechanism can be a metal torsion spring. The spring mechanism activates the rotating cam 2, urging the rotating cam 2 into a closed position grasping the rope. The spring 3 is incorporated in the body 1, as illustrated, or a separate spring 6 as shown in FIG. 3 can be included in the assembly.

Figure 4:
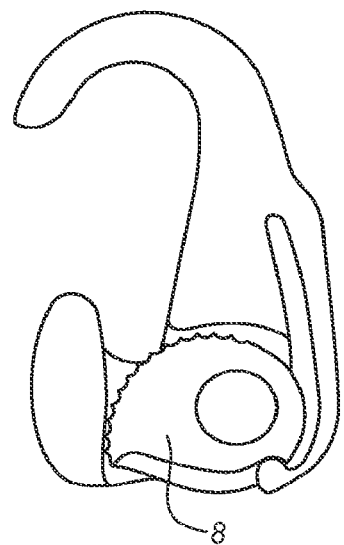
FIG. 4 is an elevational side view illustrating the self-locking hook for a rope or cord of FIG. 1, with the rotating cam biased into a grasping position.
Figure 5:
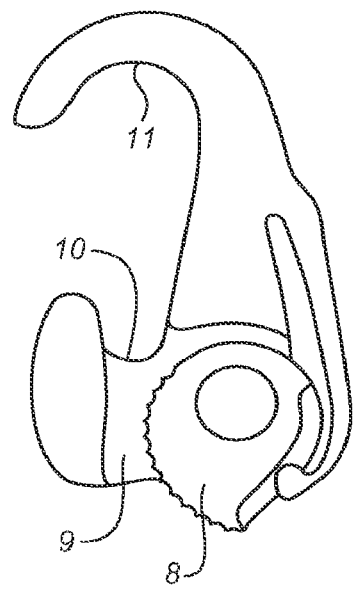
FIG. 5 is an elevational side view illustrating the self-locking hook for a rope or cord of FIG. 1, with the rotating cam opened into an open position.

In another embodiment, the body 1 of the self-locking hook is constructed by machining or molding metal or plastic. The rotating cam 2 also can be made by extrusion of metal or plastic. Therefore, the entire apparatus may be created by extruding two pieces. FIG. 4 shows cam 8 in an engaged configuration, and FIG. 5 shows cam 8 in a released configuration, flexing spring 3 and revealing leverage point 10 and cord channel 9. Hook 11 is also visible.

Figure 6:
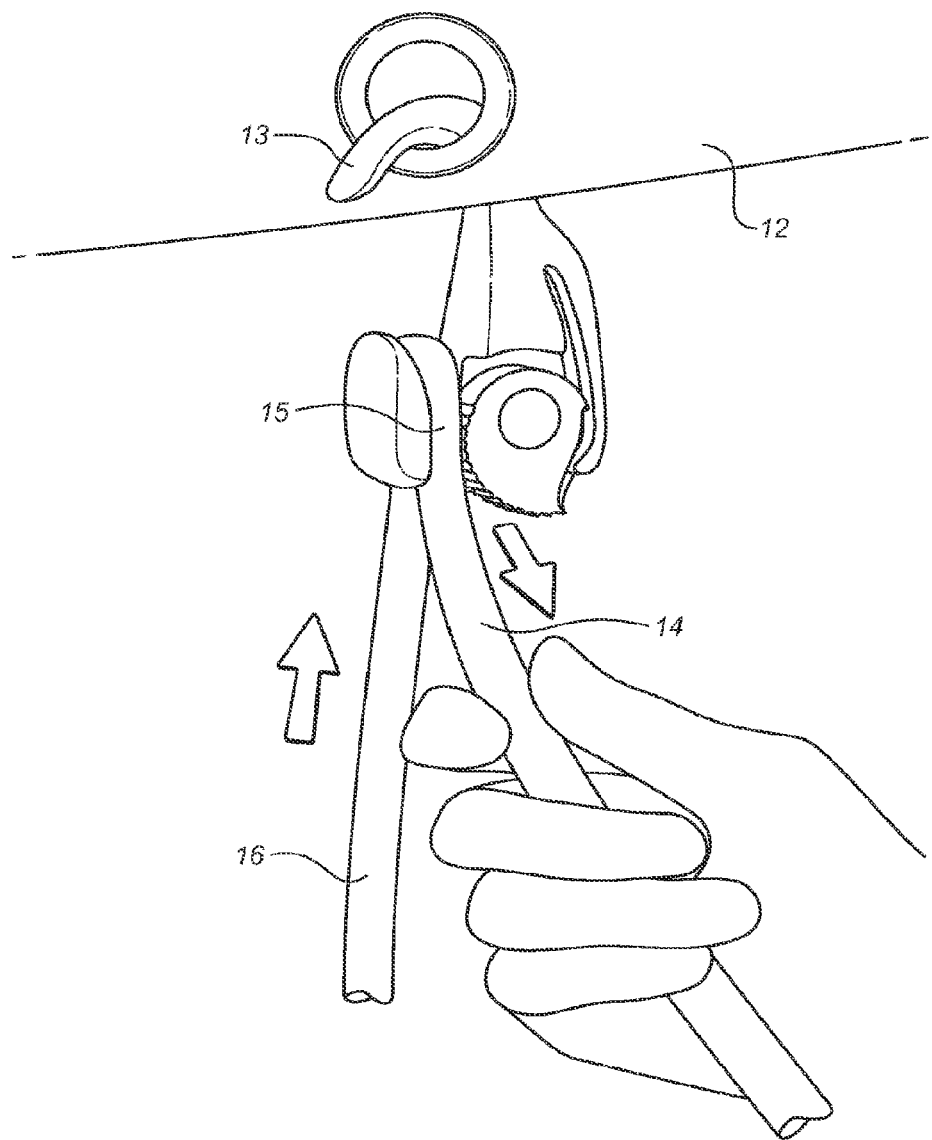
FIG. 6 is a perspective view illustrating the self-locking hook for a rope or cord of FIG. 1, with a rope or cord inserted between a block and the rotating cam.

FIG. 6 shows the self-locking hook in use to tie down a tarp 12 having an eyelet through which hook 13 passes. Cord 15 may be pulled by the user in the direction of the arrows shown. In this case, the cam will automatically release and section 16 of the rope may be reduced while section 14 is increased, thereby increasing tension. The cam will automatically lock when the cord 15 is released, due to the force of friction of the rope pulling the cam and the spring.

Figure 7:
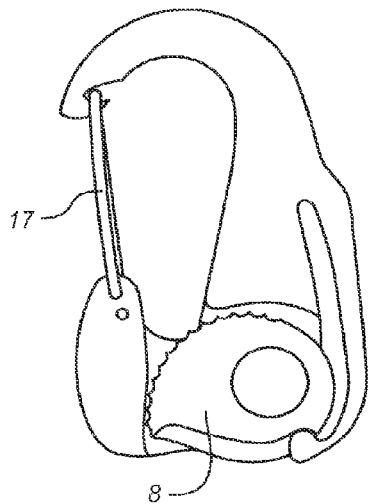
FIG. 7 is an elevational view illustrating still another embodiment of the self-locking hook for a rope or cord, with the hook having an optional gate.
Figure 8:
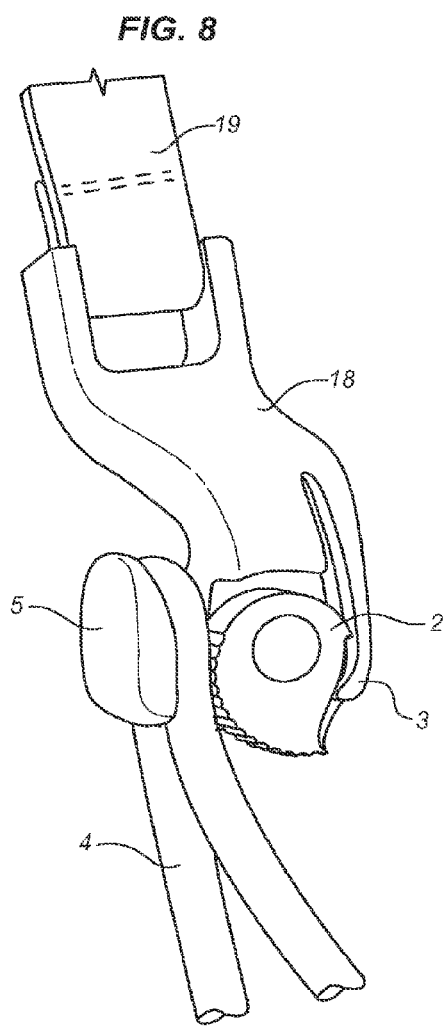
FIG. 8 is a perspective view illustrating yet another embodiment of the self-locking hook for a rope or cord, with the hook replaced by another means for attaching.
Figure 9:
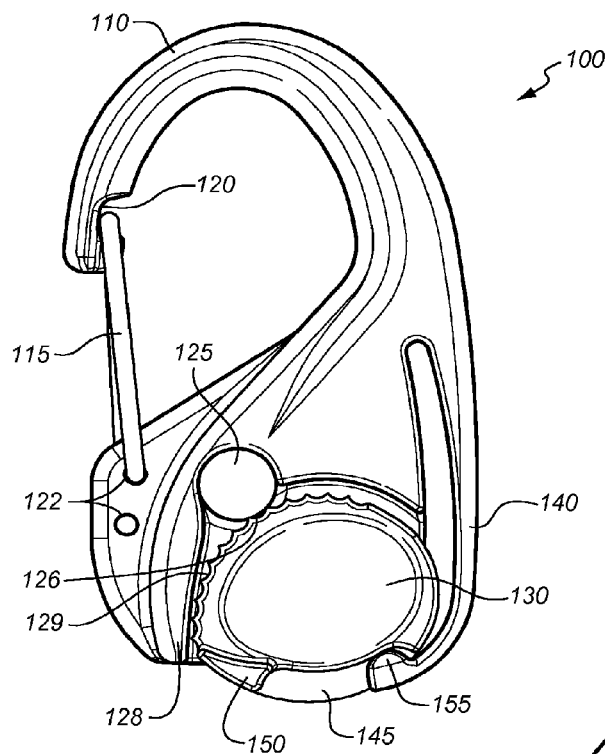
FIG. 9 shows a side view illustrating an alternative embodiment of a self-locking hook.

FIGS. 7 and 8 show alternative embodiments of the self-locking hook. FIG. 7 shows a carabineer gate 17 included with cam 8. FIG. 8 shows an alternative to the hook that includes a body portion 18 that is configured to incorporate a strap 19. A variety of attachments may be incorporated in place of the hook or strap mechanism.

FIGS. 9-13 show another embodiment of a self-locking hook 100. Self-locking hook 100 has many similarities to previous embodiments. Self-locking hook 100 includes a hook portion 110 that provides for hooking on various belts, loops, ropes, or objects. Hook portion 110 is closed by wire latch 115 which fits into notch 120. Receiving holes 122 provide for receiving the wire latch 115. Wire latch 115 is bent such that it tends to remain closed against notch 120. Aperture 125 is provided for passing a rope or cord through. Notch 126 is included at the bottom of aperture 125. Surface 128 opposes gripping surface 129 (surface 128 and surface 129 may also be referred to as the first gripping surface and the second gripping surface, respectively) and provides for the locking of a rope or cord in the cam system of the self-locking hook 100. Gripping surface 129 is part of cam gripper 130. The body of the cam gripper includes a groove 145 having stop 150 which is interfaced with spring 140 having catch lip 155. Spring 140 is a straight arm spring in this embodiment. Spring 140 is integrated into the body of self-locking hook 100 and molded as the same piece of material in the embodiment shown. The shape of cam gripper 130 is elliptical and as it turns, it presses against spring 140, flexing it away from the body of self-locking hook 100. The catch lip 155 slides along groove (or channel) 145 until it reaches stop 150. Catch lip 155 also functions to prevent cam gripper 130 from being removed or pulled away from the body of self-locking hook 100. Catch lip 155 extends away from the surface of spring 140 so that it prevents cam gripper 130 from being pulled away.

Figure 10:
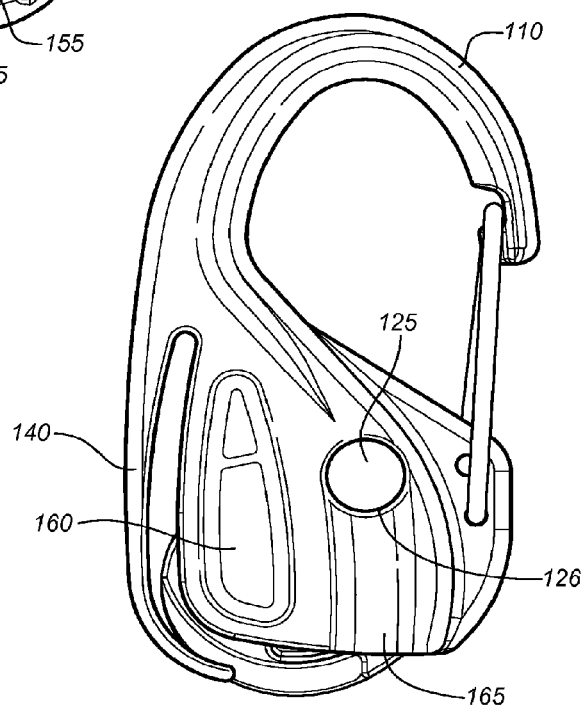
FIG. 10 shows the opposite side view of the self-locking hook of FIG. 9.

FIG. 10 shows the reverse side of self-locking hook 100. Here, molding cutout 160 is visible. This cutout 160 allows for ease of molding and less plastic usage. Channel 165 provides for alignment of a cord as it is fed through aperture 125 and tensioned in place.

Figure 11:
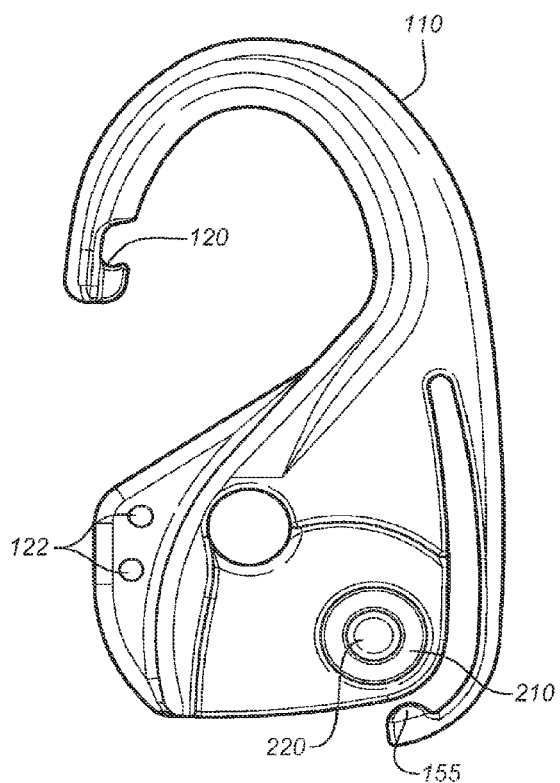
FIG. 11 show the self-locking hook of FIG. 9 with the cam and gate removed.
Figure 12:
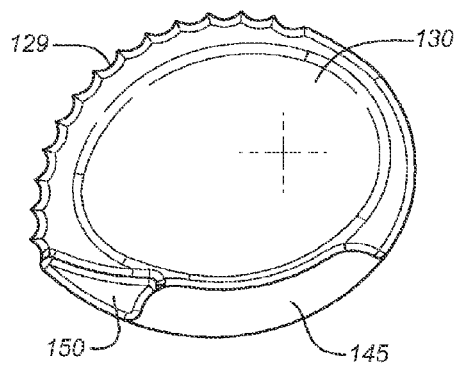
FIG. 12 shows a side view of the cam of the self-locking hook of FIG. 9.
Figure 13:
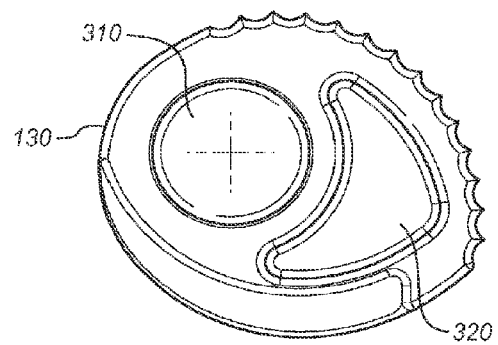
FIG. 13 shows the opposite side view of the cam of FIG. 12.

FIG. 11 shows the self-locking hook 100 with cam gripper 130 removed. Here, axel 210 is visible with cutout 220. Cam gripper 130 fits on this axel and rotates to provide gripping action. FIG. 12 show a close-up view of cam gripper 130; and FIG. 13 provides the rear view of cam gripper 130. Aperture 310 fits around axel 210 and provides for pivoting action of cam gripper 130. Cutout 320 provides for plastic savings and ease of molding.

In usage, a cord is fed from the side of self-locking hook 100 that does not include cam gripper 130 through aperture 125 and then is pushed through cam gripper 130 if the rope is rigid enough; or cam gripper 130 may be actuated by the user to provide room for the cord to advance between surface 128 and gripper surface 129. The long end of the cord should be on the side opposite cam gripper 130. This is because, when the cord is pulled, friction will pull and tend to rotate cam gripper 130 towards surface 128 providing for increased gripping. If it is oriented the other way, or without going through the aperture 125 first, the pull will tend to release, since friction will pull cam gripper 130 open. To release cam gripper 130, the user merely pulls the spring 140 back so that catch lip 155 does not oppose cam gripper 130 from releasing by locking on channel 145. Aperture 125 may also provide for a pivot point for tightening a cord passing through aperture 125 and cam gripper 130. Aperture 125 provides for a leverage point and, as the user pulls the cord through cam gripper 130, it will release tension. When the user releases the cord, the tension of the cord and spring 140 will tend to cause the cam gripper 130 to grip. The user may use the self-locking hook 100 in a ratcheting fashion this way, by pulling and releasing and having cam gripper 130 hold the cord and then pulling hard again to increase tension.

Figure 14:
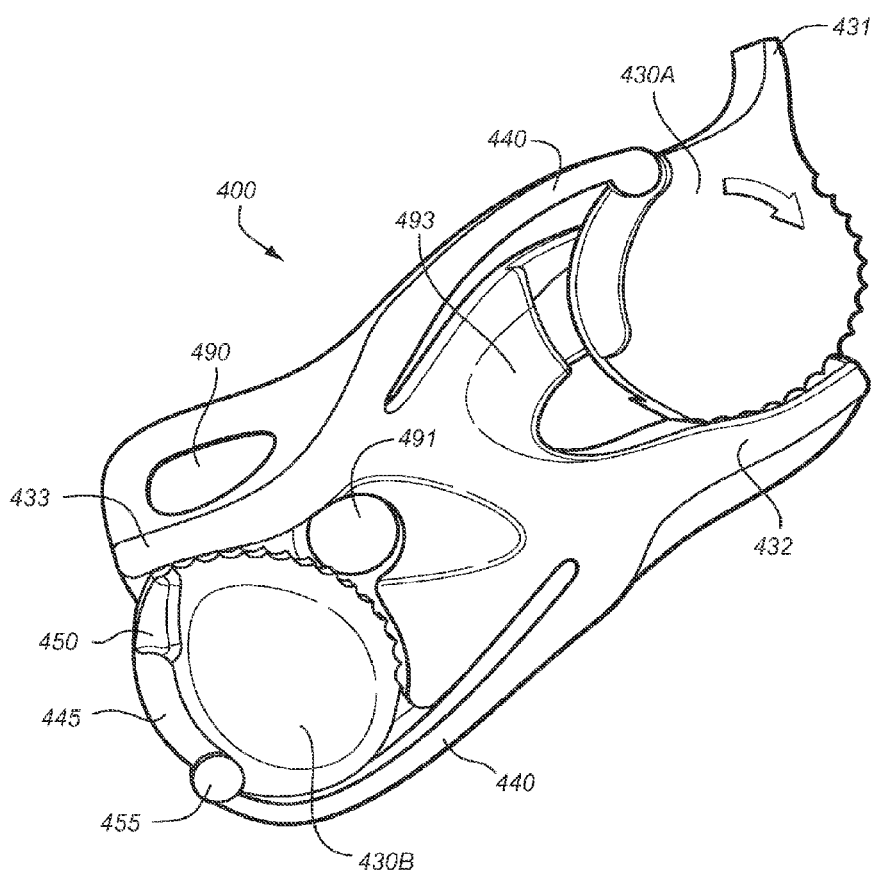
FIG. 14 shows another embodiment of a self-locking clip.
Figure 15:
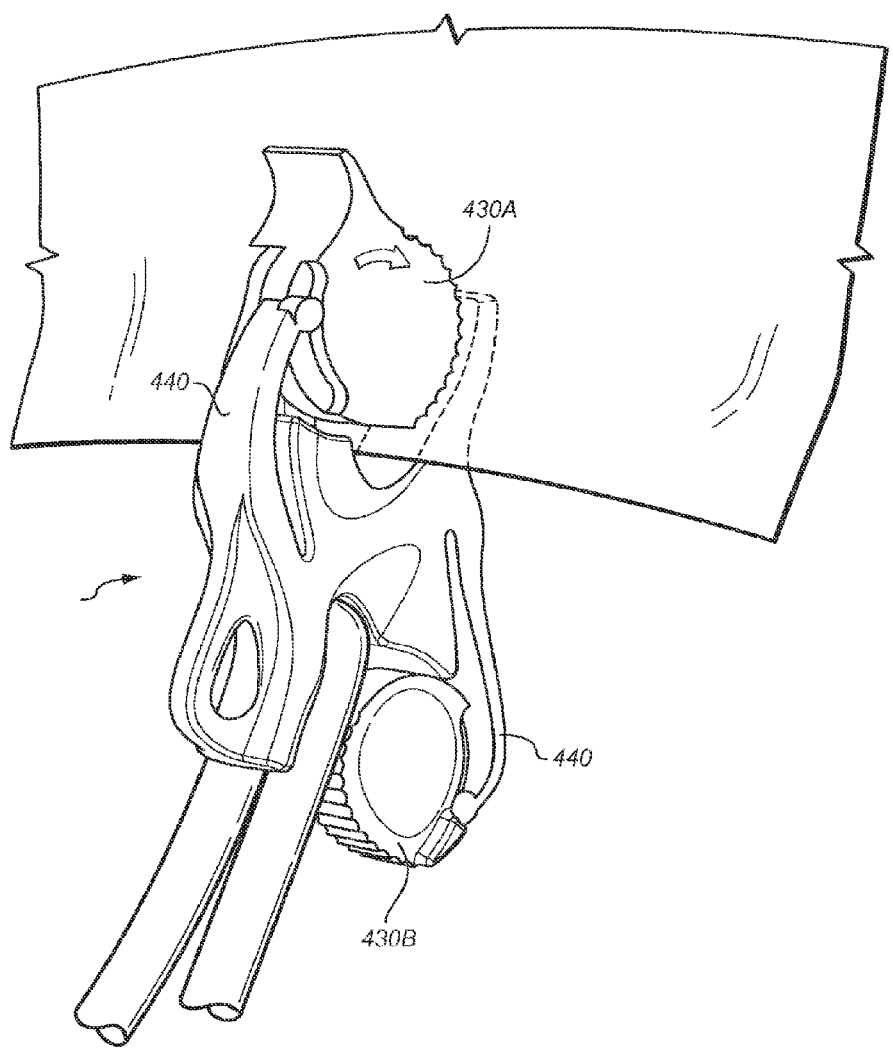
FIGS. 15 and 16 show the self-locking clip of FIG. 14 in use.
Figure 16:
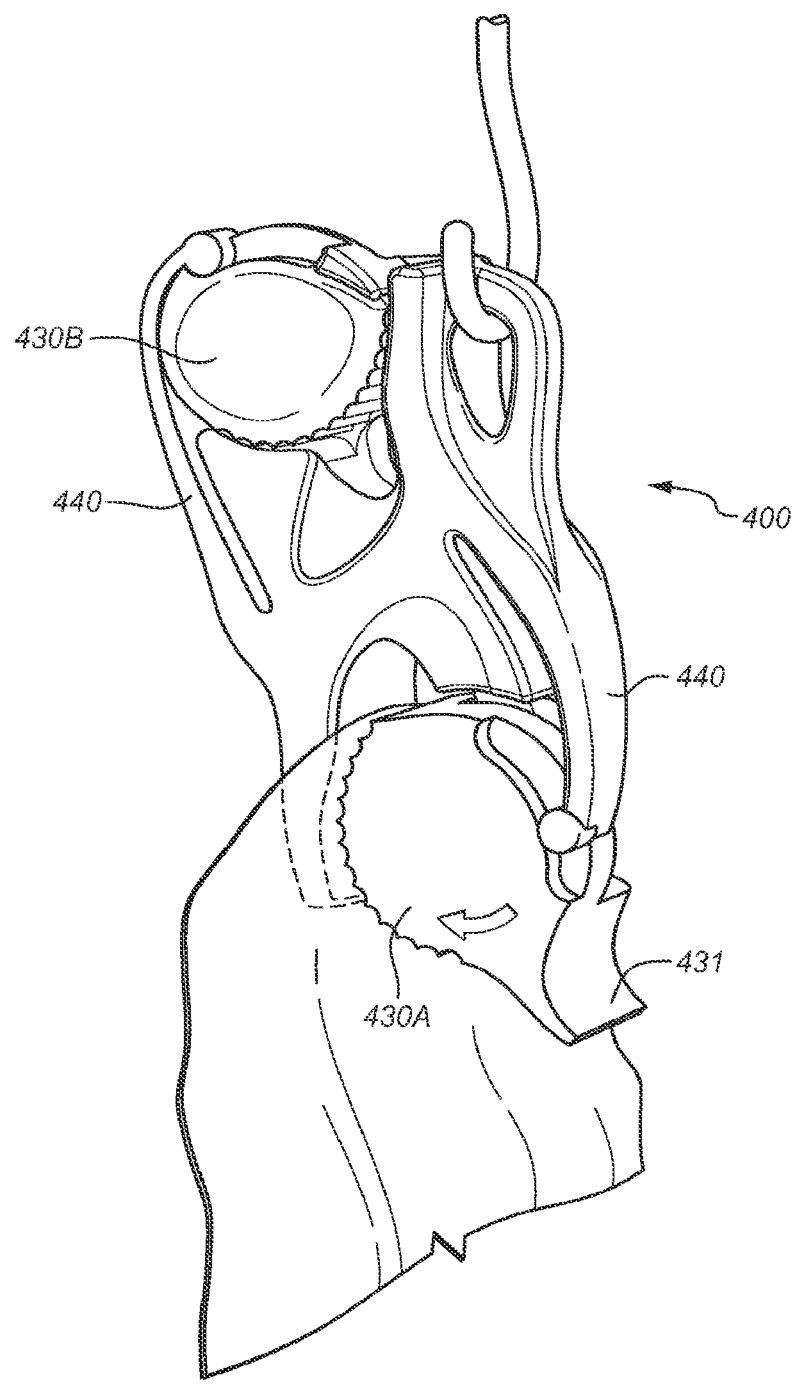

FIG. 14 shows another embodiment of a self-locking clip. This version includes two cams 430A, 430B, one on either side of the device 400. Device 400 includes external straight springs 440 with catch lips 455 to prevent cams 430A, 430B from releasing. In this version, one of the cams 430A has a release tab 431. The cams may include channels 445 and stops 450. More slim gripping surfaces 432, 433 are included as opposed to the previously shown cord blocks. On one side of the device, a cam 430B interacts with aperture 491 and provides for cord tensioning as above. This side also includes slot 490 for additional tying or hanging. The opposite side cam 430A with release tab 431 is designed for attaching to a piece of cloth, fabric, tarp. For example, it may be used in conjunction with a tent or similar tarp. The body area 493 does not include an aperture since it is for grabbing fabric. In alternative embodiments, the cam sides may match, both having an aperture. Cam 430A has an opposite configuration from cam 430B. In cam 430B, when a rope is pulled away from the device on the same side as cam 430B, the cam releases. If the rope is pulled away on the opposite side, cam 430B holds. In other words, clockwise rotation of cam 430B tends to hold the cord, and counterclockwise rotation tends to release the cord. In contrast, cam 430A tends to hold under counterclockwise rotation and release under clockwise rotation. FIG. 15 shows the device being used to hold a tarp and rope as would be used in conjunction with a tent. FIG. 16 shows device 400 on a hook supported by aperture 490 and a piece of fabric held in the opposite end. In this way, the device could be used for hanging clothes or other items.

Figure 17:
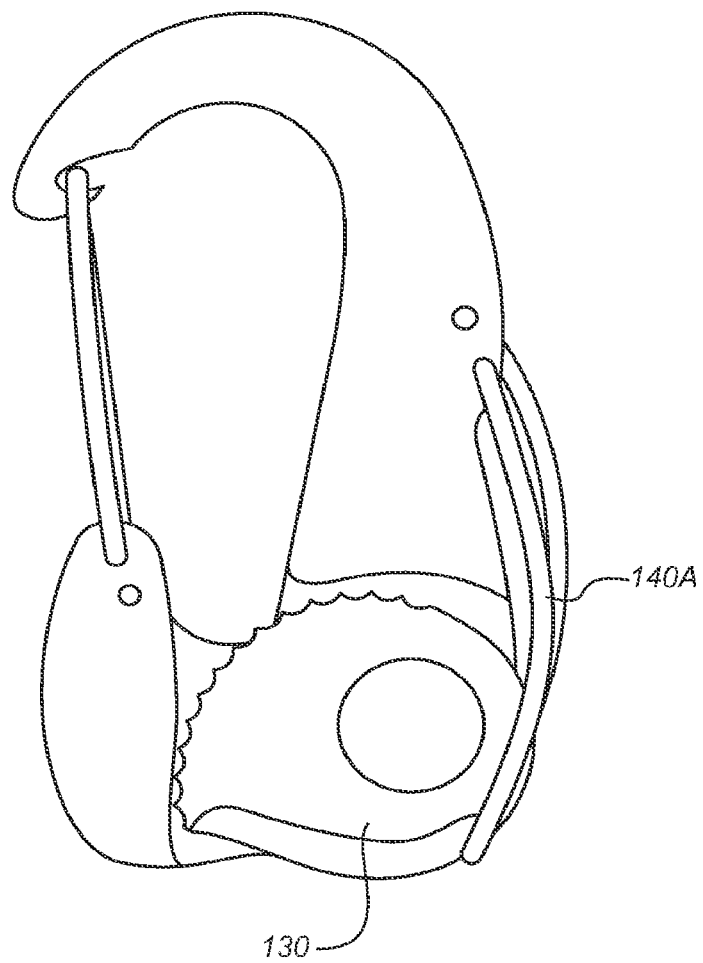
FIG. 17 shows another embodiment of a self-locking clip.

FIG. 17 shows an alternative embodiment of the self-locking hook utilizing a metal spring arm 140A. This metal spring arm may be attached in the same fashion as the carabineer gate and functions similarly to the spring arm 140 above by applying force to cam 130. As is clear, a variety of external arm type springs and internal springs may be used.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein, but is intended to cover modifications within the spirit and scope thereof as defined by the appended claims and any and all equivalents thereof. Note that, although particular embodiments are shown, features of each attachment may be interchanged between embodiments.

What is claimed is:

1. A self-locking clip comprising:
   a clip body;
   a rotating cam gripper, the rotating cam gripper pivotally mounted on the clip body; and
   a spring arm, the spring arm integrated into the clip body, the spring arm configured to provide tension to the rotating cam gripper such that the rotating cam gripper is held against a first gripping surface on the clip body wherein the rotating cam gripper is asymmetrically mounted, the rotating cam gripper configured such that, when the rotating cam gripper rotates in a first direction, the rotating cam gripper extends towards the spring arm, flexing the spring arm, the rotating cam gripper has a first channel, the first channel contacting the spring arm, the first channel terminates in a stop, the stop configured to prevent over-rotation of the rotating cam gripper, and the self-locking clip includes a catch lip on the spring arm, the catch lip sized to fit in the first channel and resides in the first channel, the catch lip configured to extend perpendicular to the rotating cam gripper and a direction of rotation of the rotating cam gripper, such that the rotating cam gripper cannot be removed from the clip body without pulling the spring arm away from the rotating cam gripper, the rotating cam gripper is asymmetrically mounted, the rotating cam gripper configured such that, when the rotating cam gripper rotates in a first direction, the rotating cam gripper extends towards the spring arm, flexing the spring arm.

2. The self-locking clip of claim 1 wherein a first side of the clip body includes a cord guiding channel, configured to guide a cord over a notch and into a gripping area between the rotating cam gripper and the first gripping surface.

3. The self-locking clip of claim 2 wherein the notch is located in an aperture of the clip body.

4. The self-locking clip of claim 3 wherein the rotating cam gripper has an approximately elliptical shape.

5. The self-locking clip of claim 4 wherein the approximately elliptical shape has a pointed and narrowed end at a first end of a major axis.

6. The self-locking clip of claim 5 wherein the rotating cam gripper includes an axle-receiving aperture, asymmetrically located in the rotating cam gripper, configured to receive an axle extending from the clip body.

7. The self-locking clip of claim 6 wherein the axle-receiving aperture is distal from the pointed and narrowed end.

8. The self-locking clip of claim 7 wherein the self-locking clip includes a hook portion for hooking the self-locking to an object.

9. The self-locking clip of claim 8 wherein the hook portion includes a carabineer gate.

10. The self-locking clip of claim 9 wherein the asymmetric mounting prevents the rotating cam gripper from rotating past the first gripping surface by virtue of contact between the rotating cam gripper and the first gripping surface.

11. The self-locking clip of claim 10 wherein the rotating cam gripper has a second gripping surface on a portion that interacts with the first gripping surface.

12. The self-locking clip of claim 11 wherein the rotating cam gripper is oriented such that pulling the cord in a first direction will rotate the rotating cam gripper towards the first gripping surface providing additional gripping of the cord.

13. A self-locking clip, comprising:
a clip body;
a rotating cam gripper, the rotating cam gripper pivotally mounted on the clip body;
a spring arm, the spring arm integrated into the clip body, the spring arm configured to provide tension to the rotating cam gripper such that the rotating cam gripper is held against a first gripping surface on the clip body, wherein the rotating cam gripper is asymmetrically mounted, the rotating cam gripper configured such that, when the rotating cam gripper rotates in a first direction, the rotating cam gripper extends towards the spring arm, flexing the spring arm; and
a notch located in an aperture of the clip body,
wherein the self-locking clip includes a catch lip on the spring arm, the catch lip sized to fit in the first channel and resides in the first channel, the catch lip configured to extend perpendicular to the rotating cam gripper and a direction of rotation of the rotating cam gripper, such that the rotating cam gripper cannot be removed from the clip body without pulling the spring arm away from the rotating cam gripper;
the rotating cam gripper includes an axle-receiving aperture, asymmetrically located in the rotating cam gripper, configured to receive an axle extending from the clip body.

14. The self-locking clip of claim 13, wherein the rotating cam gripper includes an axle-receiving aperture, asymmetrically located in the rotating cam gripper, configured to receive an axle extending from the clip body.

* * * * *